Patented Jan. 13, 1942

2,269,743

UNITED STATES PATENT OFFICE 2,269,743

MERCURY 9,12-OCTADECADIENOATE AND PROCESS OF MANUFACTURING

Raymond Arthur Stone, Chicago, Ill.

No Drawing. Application February 8, 1940, Serial No. 317,975

3 Claims. (Cl. 167—22)

This invention relates to new chemical compounds designated as mercury linoleates, and comprising the mercury salts of 9,12-octadecadienoic acid.

It is an object of this invention to provide a new composition of matter comprising the substance mercury linoleate. Another object is to provide the chemical compound mercuric linoleate. Another object is to provide mercurous linoleate. A further object is to provide new compositions of matter comprising linoleates of mercury in colloidal dispersion. Still another object is to provide new disinfectants of proven germicidal efficacy. Yet another object is to provide a new germicidal dispersion freely miscible with rubber latex, and which retains its germicidal power in such latex and imparts active germicidal properties to articles made therefrom. Still a further object is to provide a germicide which can be introduced into rubber latex without discoloring or otherwise injuring articles to be made therefrom. Another object is to provide a disinfectant substance which retains its potency when heated while in contact with rubber and cotton and other textile materials. Other objects are to provide compositions of matter possessing antiseptic, germicidal, spermicidal, bactericidal, fungicidal or sterilizing properties: in this specification and the claims appended hereto the term "Disinfectant" is used generically to include any or all of the aforementioned properties. Another object is to provide new disinfectants capable of use in aqueous dispersion, in solution in organic solvents, and in salves, jellies, suppositories, soaps and pastes, as well as in surgical gauze, dry-sealing bandage material, rubber-impregnated fabrics, adhesive tape, and the like. Another object is to provide an article of manufacture possessing disinfectant properties and comprising bandage material impregnated with mercury linoleate.

Other objects will become apparent as the invention is hereinafter more particularly described.

Because rubber in the condition in which it is used in self-adhesive bandage material is deleteriously affected by heat, it is not feasible to sterilize self-adhesive bandage material by autoclaving or other physical treatment. Thus it will be seen that the bandage industry requires a chemical sterilizing agent that is convenient to use in the course of its regular manufacturing operations, in addition to being economical and efficacious. It was this need that led to the synthesis of the substances of the present invention. Further investigation showed that these substances possessed numerous other advantages, hereinafter described in detail, which render them of great value for medicinal and commercial purposes.

I have discovered that the linoleates of mercury can be prepared in a number of different ways. One generic method of preparation of these substances is to react inorganic salts of mercury with salts of linoleic acid. Another generic method is to react an oxide of mercury with linoleic acid to obtain the corresponding mercury linoleate.

In order more particularly to disclose the nature of my invention, several examples will now be more fully described. It should be clearly understood, however, that this is done entirely by way of example, and is not to be construed as a limitation upon the spirit and scope of the appended claims.

Example I

To a mixture of 25 grams (g.) of linoleic acid and 150 milliliters (ml.) of distilled water was added 9.0 g. mercuric oxide in small portions over a period of about 3 hours, the mixture being warmed slightly and agitated continuously. A light tan solid formed gradually, and settled to the bottom of the container. At the end of the reaction, the supernatant liquid was poured off, and the tan solid (which is mercuric linoleate) was collected, washed first with water, then with acetone, and dried.

The course of the above reaction is indicated by the following chemical reaction:

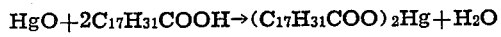

$$HgO + 2C_{17}H_{31}COOH \rightarrow (C_{17}H_{31}COO)_2Hg + H_2O$$

Example II 21 g. mercuric chloride were dissolved in 610 ml. water, and the resultant solution was heated to 40° C. To this was slowly added, under brisk stirring, another solution, also at 40° C., prepared by diluting 117 g. commercial aqueous 50% sodium linoleate with 370 ml. water. This procedure produced a milky-white fluid, comprising colloidal mercuric linoleate, and containing approximately 6% mercury linoleate.

The chemical reaction involved may be indicated by the following equation:

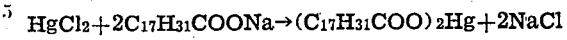

$$HgCl_2 + 2C_{17}H_{31}COONa \rightarrow (C_{17}H_{31}COO)_2Hg + 2NaCl$$

Colloidal mercury linoleate prepared as in Example II above is free from contamination with bichloride of mercury; however it does contain some unreacted sodium linoleate which improves the product by rendering the dispersion more stable, and in other ways.

Colloidal mercury linoleate prepared as described in Example II possesses numerous advantages characteristics. The 6% dispersion of colloidal mercury linoleate, when tested by the U. S. Food and Drug Administration Staphylococcus aureus phenol coefficient method, was found to have a phenol coefficient of 1.3. Even a solution containing only 60 parts of mercury linoleate in 1,000,000 parts of water was found to be actively germicidal, and destroyed microbes of Staphylococcus aureus in less than 5 minutes. The great utility of mercury linoleate as a disinfectant is thus clearly apparent.

In addition, this 6% dispersion was found to have a very low surface tension, namely, 13 dynes/cm. When diluted with an equal volume of water, the surface tension of the dispersion dropped to 9 dynes/cm. The low surface tension of colloidal dispersions of mercury linoleate enhances their value for purposes of disinfection.

Further advantages inherent in the substances of the instant invention are their relatively low toxicity and freedom from irritant action. They are also non-corrosive to surgical instruments.

A further illustration of the utility of the substances of the present invention is found in their applicability to the manufacture of self-adhesive bandage material. Colloidal mercury linoleate, such as that prepared in Example II above, is freely miscible in all proportions with commercial rubber latices. Cotton gauze was impregnated with an aqueous solution comprising 0.2% colloidal mercury linoleate and 15% rubber solids dispersed in the form of latex. The wet gauze was dried in a current of heated air in a commercial hot oven of the type used in the manufacture of self-adhesive bandage material. The resulting bandage was not discolored, nor tacky to the touch, but possessed good adhesive properties when pressed dry upon itself. This bandage, made with colloidal mercury linoleate, was investigated bacteriologically and was found to be sterile and to possess germicidal properties. When tested by the U. S. Food and Drug Administration Staphylococcus aureus agar-plate method, the bandage exhibited good antiseptic inhibitory properties and good diffusion, a "zone of inhibition" 5 millimeters in width and completely surrounding the test specimen being obtained. Thus it is apparent that mercury linoleate retains its germicidal power when mixed with rubber latex, and is capable of imparting active disinfectant properties to articles made from such medicated latex.

In order more fully to disclose the nature and scope of the present invention, certain additional properties of mercury linoleate will now be described. The addition of acetone to a colloidal dispersion of mercury linoleate, prepared as in Example II above, resulted in the formation of a solid precipitate. The supernatant liquid was decanted, and the precipitate was washed with water until the addition of silver nitrate test solution to the washings gave a negative test for chlorides, and the addition of mercuric chloride test solution to the washings gave a negative test for sodium linoleate. The solid mercury linoleate thus prepared and purified was washed with acetone and dried. The solid mercuric linoleate thus obtained is a greasy material, containing about 26.4% mercury in chemical combination, having the consistency of melted butter, being of a light brown color, possessing a characteristic sweet odor, and having a density greater than that of water. Mercuric linoleate is insoluble in water, but is extremely soluble in benzene, forming a brown solution. The addition of solid potassium hydroxide to this solution results in the formation of a green precipitate. At room temperature, 100 ml. of alcohol dissolves 0.63 g. mercuric linoleate; 100 ml. of ether at the same temperature dissolves 0.39 g. of this substance.

Colloidal dispersions of mercury linoleate are characterized by the following chemical behavior:

Upon standing for a period of about 3 weeks, the colloidal dispersion breaks down to yield a black deposit of mercury. Treating colloidal mercuric linoleate with hydrogen sulphide results in the formation of a light-gray colloidal dispersion, with simultaneous formation of a trace of black precipitate. The addition of concentrated sulphuric acid to colloidal mercury linoleate results in the formation of linoleic acid plus certain black decomposition products.

Example II above illustrates the preparation of only one of the kinds of colloidal mercury linoleate within the scope of the present invention. Example III discloses another type of colloidal mercury linoleate, and the preparation thereof.

*Example III*

10.7 g. mercurous nitrate monohydrate were dissolved in 187 ml. water and the resultant solution was slowly added, under brisk stirring, to a solution consisting of 14.4 g. sodium linoleate in 117 ml. water. The reaction was carried out at room temperature. A white curdy solid formed and dissolved on further stirring to yield a grayish-white colloidal dispersion, comprising colloidal mercurous linoleate.

The chemical reaction involved may be indicated by the following equation:

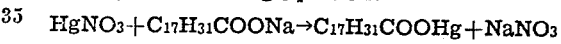

$HgNO_3 + C_{17}H_{31}COONa \rightarrow C_{17}H_{31}COOHg + NaNO_3$

Colloidal mercurous linoleate is not as stable as colloidal mercuric linoleate.

In the foregoing description of the present invention it will be apparent that many variations in detail may be made by those skilled in the art. Thus, for example, the procedure in Example I may be varied by dissolving the linoleic acid in alcohol or in benzene, and recovering the mercury linoleate at the end of the reaction by distilling off the solvent and the water formed in the course of the reaction. Neither is the present invention restricted to the use of the particular reactants recited in Examples II and III, but any soluble salts of mercury and of linoleic acid may be substituted therefor. Many other variations in detail may be made without departing from the spirit of the invention. I therefore intend to be restricted only in accordance with the following patent claims.

I claim:

1. A disinfectant in colloidal form comprising the reaction product of aqueous mercuric chloride solution and a stoichiometric excess of aqueous sodium linoleate solution.

2. A colloidal solution derived from the interaction of aqueous mercuric chloride and a stoichiometric excess of aqueous sodium linoleate and characterized by germicidal power, low surface tension, and ready miscibility with aqueous fluids.

3. A disinfectant composition for use in the manufacture of sterile rubber-containing articles, comprising the reaction product of aqueous mercuric chloride solution and a stoichiometric excess of aqueous sodium linoleate solution.

RAYMOND ARTHUR STONE.